F. C. HUTTON.
VALVE.
APPLICATION FILED AUG. 10, 1915.
1,197,126.
Patented Sept. 5, 1916.
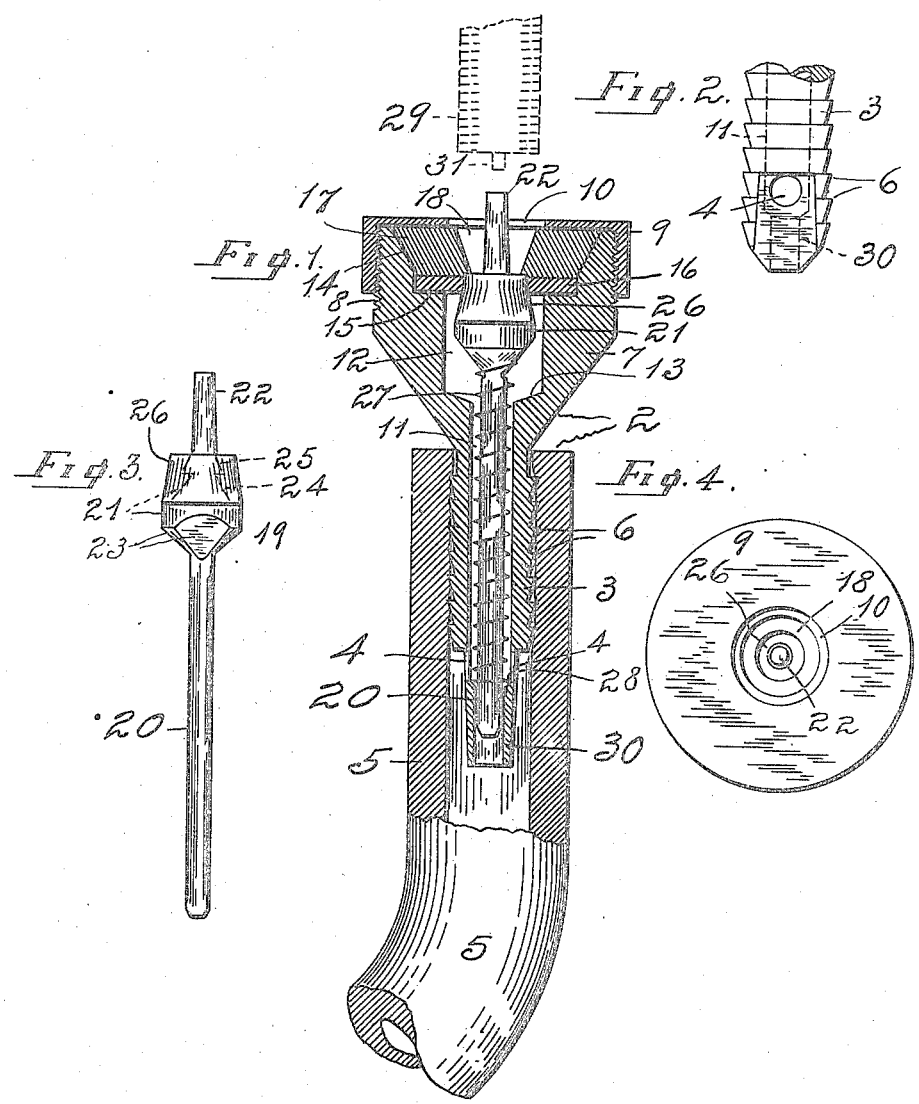
WITNESS:
J. Ballentine.
INVENTOR:
F. C. Hutton,
By H. M. Richards,
atty.

UNITED STATES PATENT OFFICE.

FREDERICK C. HUTTON, OF GALESBURG, ILLINOIS.

VALVE.

1,197,126.   Specification of Letters Patent.   Patented Sept. 5, 1916.

Application filed August 10, 1915. Serial No. 44,720.

*To all whom it may concern:*

Be it known that I, FREDERICK C. HUTTON, a citizen of the United States, and a resident of Galesburg, in the county of Knox and State of Illinois, have invented a new and useful Valve, of which the following is a specification.

My invention relates to means whereby air under compression may be introduced into hollow bodies, such as bicycle, motorcycle and automobile tires, in order to either test or fill them. Such tires are generally equipped with air-tubes or valves, and the usual method employed in testing or filling them is to use a hose fitted at one end with a connection consisting of some sort of contrivance having a small central opening for permitting the escape of air, the force of which escaping air, when the connection is held against the tire-valve, is intended to force the valve-stem back to open the valve and permit the air to flow into the tire. This it frequently fails to do, because of many reasons, among which may be mentioned improper construction of the connection, wear of its parts, and the tendency of the tire-valve to stick or lodge; and unless the hose connection is so held with reference to the valve that the escape of air between them is practically impossible a large quantity of air will be lost. Again, when the valve fails to work the operator must find some small instrument and insert it into the valve-shell to force open the valve proper. Inasmuch as he frequently uses a match or a splinter of wood, or some other thing that will break off in the valve the result is bad, for the latter is generally rendered inoperative.

The hose is usually (in shops) connected with a tank of compressed air and the supply to the former is controlled by a shut-off cock adjacent the tank. It will be seen that it becomes necessary, each time a tire is tested, for the operator to step to the shut-off cock both on starting and on completing the operation. Each time the cock is shut off all the air in the hose is wasted, and as the hose is generally some 8 to 12 feet in length and the tests made a great number of times hourly, the loss of air is very considerable. In filling a tire it is extremely desirable to admit (at times) only a minute quantity of air, and this is done—the operator meanwhile judging the resiliency of the tire by his fingers—by tapping or barely touching the connection to the tire-valve and immediately withdrawing it. This is sometimes repeated ten or more times before the desired amount of air is admitted. If it be required to turn off the cock each time, a large amount of air is lost, and also all the air contained in the hose at each operation, and if the air be left flowing during the repeated tappings, a large quantity is wasted. Moreover, it is not infrequent that the air comes with such a rush that the tire is overfilled and bursts. Owing to the construction of the discharge valves heretofore used they are leaky. Others permit the escape of air when they strike against an object or are dropped upon the floor. In fact, the means and methods heretofore employed for testing and filling tires have been crude and extremely unsatisfactory.

The primary object of my invention is to provide novel means, connected with the source of air-supply, which will effectively and positively open the valve in the tire, the said means including a valve which is in turn simultaneously opened by the tire-valve, the simultaneous opening of the valves being automatic upon the mere bringing of their ends into contact, and both valves being adapted to automatically close instantly upon the contact being dissolved.

Other objects are to eliminate all the objectionable features attendant upon testing and filling tires, chief of which are loss of time, the employment of a manually operated shut-off, the employment of a shut-off of any character, and injury to tire-valves.

Concisely stated, therefore, the objects of the invention are to generally improve the construction and increase the efficiency, capacity and utility of valves of the character noted.

The invention consists, substantially, in the improvements hereinafter described.

The nature of the invention is disclosed in the following specification and a preferred embodiment thereof is illustrated in the accompanying drawing, in which the individual elements and, where necessary, the parts thereof, are designated each by the same reference letter wherever applied in the several views and in which:

Figure 1 is a central sectional view, partly in elevation, of a valve embodying my improvement, shown as attached to a hose. In order to illustrate the operation a fragment of a tire-valve is shown by dotted lines. Fig. 2 is a fragmental detail, an elevation, showing the lower end portion of the tubular foot of the valve-shell, turned one-fourth around from the position indicated in Fig. 1; Fig. 3, a detail of the valve-stem and closure; and Fig. 4, a top plan.

Considering the drawings in detail, 2 indicates a valve-shell or casing comprising an elongated, tubular foot 3 the lower end of which is reduced and oblong in cross section and provided with a transverse opening 4 to permit the air to pass upward at the sides of said reduced portion and to enter said opening. The valve foot is held securely in the hose 5 by means of serrations 6. The head of the shell, indicated by 7, is provided with threads 8 for engagement by those of a cap 9 having a centrally arranged aperture 10. The channel 11 in the foot 3 communicates with an enlarged passage 12 in the head 7, the lower portion of the passage 12 affording a subconical annular valve seat 13. The upper portion of the head is provided with a recess 14 the bottom of which affords a seat 15 for a retaining annulus 16 which, after placement of the valve-stem and closure (presently described) is fixedly secured therein, as by sweating, brazing, soldering, or in any other suitable manner whereby to retain said stem and closure in operative position within the shell, but in such manner that the annulus may be readily removed in order to repair or replace any of the parts therebeneath.

17 designates a rubber or other resilient compression ring or retaining annulus having a conical central opening 18 slightly less in circumference than the opening 10 in the cap 9.

19 designates an integral valve-stem and head comprising a foot 20, a head 21 and a tongue or extension 22, the latter normally projecting through the opening 10. The main or central portion of the head is annular but its lower face is angularly conical or beveled, as shown best at 23, Fig. 3. The upper portion 24 of the head is conical and its apex is surmounted by an annular retaining boss 25.

26 designates a conical resilient ring or valve-closure seated on the head proper 21, surrounding the conical upper portion thereof and held securely by the boss 25.

27 designates a valve-closing spring one end of which bears against the portion 23 of the element 21 and the other end of which seats on a shoulder 28 in the lower portion of the foot 3. Below this shoulder the passage in said foot is of such reduced size (as indicated at 30) as to just permit free movement of the stem 20, for which it serves as a guide; therefore the necessity of the openings 4.

At the top of the device shown in Fig. 1 I have diagrammatically illustrated a tire-valve, 29. To operate the devices shown the operator will press the point of the tongue 22 against the stem 31 of the tire-valve with such pressure that each will force the other into its shell, whereby to open both valves. The air from the compressor (not shown) will rush past the reduced portion 30 of the foot 3 and in through the apertures 4 and through the passages 11 and 12, thence through the opening in the retaining annulus 16—which will be open because of the retracted closure 26 which in Fig. 1 is shown as compressed—thence through the openings 18 and 10 and thence into the tire-valve, the adjacent end of which having been passed through the opening 10 will compress the block 17 and prevent the passage of air. Should the valve stem be depressed to such extent that the beveled or angular lower face 23 of the valve-stem-head strikes the seat 13 it will seat thereon and its movement be limited thereby. However, the flow of fluid will not be shut off thereby, for the air will rush in past said angular head, which of course does not seat snugly on the seat 13. Instantly upon the pressure being released the spring 27 will return the element 19 to its normal position and the closure will be yieldingly held in the opening in the annulus 26. To further insure closure (to prevent loss of air) the lower end of the opening in the block 17 is somewhat smaller than is the opening in the annulus, whereby when the upper face of the closure 26 is forced to its normal position it will bear thereagainst, to prevent the escape of air which might pass should there be a fault or flaw in the coacting portions of the elements 16 and 26.

It of course will be understood that while I have described my invention as an air-valve it may be used with equal facility as a liquid or a gas-pressure valve, in either of which cases it would perhaps be necessary to elongate the stem or tongue 22.

Having thus described the nature of my invention I claim as new the following, to-wit:—

1. A device of the character described including a shell having an axial opening extending substantially throughout its length and provided with a valve-seat, a retaining-cap on the outer end of the shell, a valve-stem having a head normally spaced from said seat, the outer end of the valve-stem projecting beyond the extreme outer end of said shell and through said cap, the lower face of said head being angular and adapted, when forced inward, to rest upon said valve-seat, a valve-closure seated on said head, a retaining annulus seated in said shell, its opening adapted to be closed by said closure, and a spring for holding said closure in position for closing said aperture.

2. A device of the character described comprising a shell having an axial opening extending substantially throughout its length and provided with a valve-seat, a valve-stem having a head normally spaced from said seat, the lower face of said head being angularly beveled, whereby to permit air to pass between it and the valve-seat, a valve-closure seated on said head, a retaining annulus seated in said shell, its opening adapted to be closed by said closure, and a spring for holding said closure in said opening.

3. A device of the character described comprising a shell having an axial opening extending substantially throughout its length and the head of the shell provided with a seat, a retaining-ring secured on said seat but removable therefrom, a compression-ring seated on said ring, a cap for retaining it thereon, a valve-stem movable in said opening and having a head, the outer end of the valve-stem projecting through and beyond said cap, and a valve closure seated on said head and adapted to close the openings in both the retaining and compression rings.

4. A device of the character described comprising a shell having an axial opening extending substantially throughout its length and the head of the shell provided with a seat, a retaining ring removably secured on said seat, a compression ring seated on said ring, a cap for retaining it thereon, a valve-stem movable in said opening and having a head, the outer end of the valve-stem projecting through and beyond said cap, a valve-closure seated on said head and adapted to close the openings in both the retaining and compression rings, and a spring adapted to hold said closure in yielding contact with said rings.

5. A device of the character described comprising a shell having an axial opening extending substantially throughout its length and having a transverse opening communicating therewith, that portion of the shell below said transverse opening being less in cross sectional area than the portion above it, a valve-stem seated in said axial opening and provided with a head, the upper portion of said shell having a retaining-ring seat, a valve-closure seated on said head, a retaining-ring on said seat, a compression-ring on said ring, and a cap for holding the retaining-ring in place, said valve-closure adapted to close the openings in both the retaining and compression rings, the valve-stem projecting through and beyond said cap whereby its projecting end may be employed to operate the valve-stem of a tire-valve.

6. In a device of the character described, a valve-shell having an axial opening, said shell provided with a seat for a retaining-ring, a retaining-ring thereon, a compression-ring seated on said retaining-ring and partly covering the opening therein, a cap for holding the retaining-ring in place, a valve-stem arranged in said axial opening and having a head, and a valve-closure seated on said head and adapted to pass through and close the opening in the retaining-ring and to abut against the compression-ring and close the opening therein, the valve-stem projecting through and beyond said cap whereby its projecting end may be employed to operate the valve-stem of a tire-valve.

7. In a device of the character described, a valve-shell having an axial opening, said shell provided with a seat for a retaining-ring, a retaining-ring thereon, a compression-ring seated on said retaining-ring and partly closing the opening therein, a cap for holding the retaining-ring in place, a valve-stem arranged in said axial opening and having a head, a valve-closure seated on said head and adapted to pass through and close the opening in the retaining-ring and to abut against the compression-ring and close the opening therein, and a spring adapted to hold said closure in the position recited, the valve-stem projecting through and beyond said cap whereby its projecting end may be employed to operate the valve-stem of a tire-valve.

8. In a valve, a shell having an axial opening, said shell provided with a seat for a retaining-ring, a retaining-ring seated thereon, a compression-ring seated on said retaining-ring and partly covering the opening therein, a cap threaded on the upper end of the shell and provided with an opening registering with those in said rings, a valve-stem arranged in said axial opening and having a head intermediate its ends, its upper end projecting through said rings and cap, and a valve-closure seated on said head and adapted to pass through and close the opening in the retaining-ring and to abut against the compression-ring and close the opening therein.

9. In a valve, a valve-shell having an axially arranged opening, a cap covering the outer end of said opening, a compression-ring having a central opening, a retaining-ring having an opening greater in circumference than that of the one in the compression-ring, both of said rings retained within the axial opening in the valve-shell and all of said openings in registration, a valve-stem one end of which projects through and beyond all of said openings, said stem provided with a head distant from each of its ends, a conical resilient ring seated on said head and embracing said stem, its smaller end adapted to pass through the opening in the retaining-ring and its outer face to abut against the inner face of the compression-ring, and means for holding said stem and thereby said head and resilient ring in said position.

10. In a valve, a valve-shell having an axial opening extending throughout its length, said opening constricted at one end and enlarged at the other, a retaining-ring in the enlarged part of the opening, a compression-ring seated thereon, a centrally apertured cap seated on the outer end of the shell, a valve-stem having a head, one end of said stem seating snugly in the constricted portion of said shell and said shell provided with a transverse opening communicating with the median portion of the axial opening and its cross-sectional area below said median portion reduced, and a valve-closure seated on said head and adapted to close the openings in said rings, the outer end of the valve-stem projecting normally through the opening in said cap.

11. A valve comprising a shell having an enlarged head and a tube-like foot, said foot adapted to fit into a hose and its lower portion of less cross-sectional area than its upper portion, whereby air may pass between the lower end of the foot and the hose, said lower end portion provided with a transversely arranged opening for the admission of air to the passage in said foot, a retaining-ring in said head, a compression-ring seated thereon, an apertured cap on said head, the openings in the three last recited elements being in alinement, a valve-stem seated in said shell and having a head distant from each of its ends, and a valve-closure seated on said head and adapted to pass through and close the opening in the retaining-ring, and to cover and close the opening in the compression-ring and thereby close the opening in the cap.

In testimony whereof I hereto subscribe my name this 31st day of July, 1915, at Galesburg, Illinois.

FREDERICK C. HUTTON.